US010439970B2

(12) United States Patent
Charignon

(10) Patent No.: US 10,439,970 B2
(45) Date of Patent: Oct. 8, 2019

(54) DYNAMIC COMMUNICATION PARTICIPANT IDENTIFICATION

(71) Applicant: Facebook, Inc., Menlo Park, CA (US)

(72) Inventor: Laurent Gabriel Stephane Charignon, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 159 days.

(21) Appl. No.: 14/822,496

(22) Filed: Aug. 10, 2015

(65) Prior Publication Data

US 2017/0048174 A1    Feb. 16, 2017

(51) Int. Cl.
*H04L 29/08* (2006.01)
*H04L 12/58* (2006.01)
*H04L 29/06* (2006.01)

(52) U.S. Cl.
CPC .............. *H04L 51/12* (2013.01); *H04L 51/04* (2013.01); *H04L 63/102* (2013.01); *H04L 67/306* (2013.01); *H04L 67/327* (2013.01)

(58) Field of Classification Search
CPC ... H04L 67/306; H04L 67/104; H04L 63/102; H04L 63/10; H04L 63/0407; H04L 63/20; H04L 63/101; H04L 51/32; H04L 65/403; H04L 12/1818; G06Q 50/01; H04W 4/206; H04W 8/18
See application file for complete search history.

(56) References Cited

U.S. PATENT DOCUMENTS

| | | | | |
|---|---|---|---|---|
| 2007/0273583 A1* | 11/2007 | Rosenberg | ............ | H04W 8/005 342/367 |
| 2008/0152097 A1* | 6/2008 | Kent | ....................... | H04L 12/66 379/93.01 |
| 2008/0189292 A1* | 8/2008 | Stremel | .................. | G06Q 30/02 |
| 2009/0013413 A1* | 1/2009 | Vera | ........................ | G06Q 10/10 726/30 |
| 2009/0143052 A1* | 6/2009 | Bates | .................. | H04M 3/4931 455/414.2 |
| 2009/0209231 A1* | 8/2009 | Benco | ................. | H04L 63/0414 455/410 |
| 2011/0274257 A1* | 11/2011 | Vaananen | ............... | G06Q 10/10 379/93.01 |
| 2012/0196581 A1* | 8/2012 | Papakipos | ............. | H04L 51/046 455/415 |
| 2013/0024250 A1* | 1/2013 | Wu | ........................ | G06Q 30/02 705/14.1 |
| 2013/0051542 A1* | 2/2013 | Yao | ................... | H04M 3/42042 379/142.09 |

(Continued)

*Primary Examiner* — Barbara B Anyan
(74) *Attorney, Agent, or Firm* — Baker Botts L.L.P.

(57) ABSTRACT

In one embodiment, a method includes receiving an identifier for a first user initiating a communication between a first device associated with the first user and a second device associated with a second user, retrieving, using the identifier, a privacy rule associated with the first user, determining, based on the privacy rule and social-networking information associated with the first user, whether one or more items of information associated with the first user are allowed to be revealed to the second user, and sending, to the second device, any of the items of information associated with the first user that are allowed to be revealed to the second user for display in association with the communication between the first device and the second device.

20 Claims, 5 Drawing Sheets

(56) References Cited

U.S. PATENT DOCUMENTS

| | | | |
|---|---|---|---|
| 2013/0060868 A1* | 3/2013 | Davis | G06Q 10/107 709/206 |
| 2014/0007255 A1* | 1/2014 | Altaf | G06F 21/6245 726/27 |
| 2014/0172917 A1* | 6/2014 | Coroy | G06F 21/6218 707/783 |
| 2014/0324570 A1* | 10/2014 | Lawrence | G06Q 50/01 705/14.44 |
| 2016/0197993 A1* | 7/2016 | Perkowski | H04L 67/1097 709/203 |
| 2016/0352671 A1* | 12/2016 | Vaccari | H04L 51/32 |
| 2017/0034176 A1* | 2/2017 | Qi | H04W 4/21 |

* cited by examiner

DYNAMIC COMMUNICATION PARTICIPANT IDENTIFICATION

TECHNICAL FIELD

This disclosure generally relates to communication participant identification.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, two or more users may participate in a communication session via various communication devices, such as a mobile phone, landline telephone, laptop computer, tablet computer, or other computing or messaging device. These devices may be associated with one or more device identifiers, such as phone numbers, screen names, application log-ins, social-networking profile names, media access control ("MAC") addresses, or the like. Often, caller identification ("caller ID") systems, such as those available in analog and digital phone systems and voice over Internet Protocol ("VoIP") systems, display information items associated with the calling participant, such as a telephone number and a personal or business name. However, some users may prefer not to share this information with other message participants depending on the circumstances of the communication or the identity of the other participants. Users often must pre-register their preference regarding display of identification information with a phone company or application. These preferences are often applied globally to all communications. Certain VoIP applications may provide a selection via a settings tab of a user interface for such a preference, but even this preference is applied statically to all communication sessions. To provide a more dynamic and intuitive approach to communication participant identification, privacy rules determine an appropriate set of information for display when communicating via various message formats. In certain embodiments, a first user initiates a communication session using a first device by calling, texting, emailing, or otherwise messaging a second user associated with a second device. In initiating the communication, a device identifier for the first device may be received by an application, process, server, terminal, or the like, and a privacy rule associated with the first user is retrieved. The privacy rule may be retrieved from a lookup table, registry, database, social-networking system, information system, or the like, or may be retrieved from other communication participants or associated devices. When the first user initiates the communication session, the privacy rule and social-networking information associated with the first user is used to determine whether information associated with the first user is allowed to be revealed to the second user and/or any additional members of the communication session. Any information that is allowed to be revealed to the second user is sent to the second user for display in association with the communication. The privacy rules and other settings may further specify various other details regarding the display of participant information, such as the level of detail to display or the type of data to display, as well as configurations for requesting and responding to requests for identification information.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
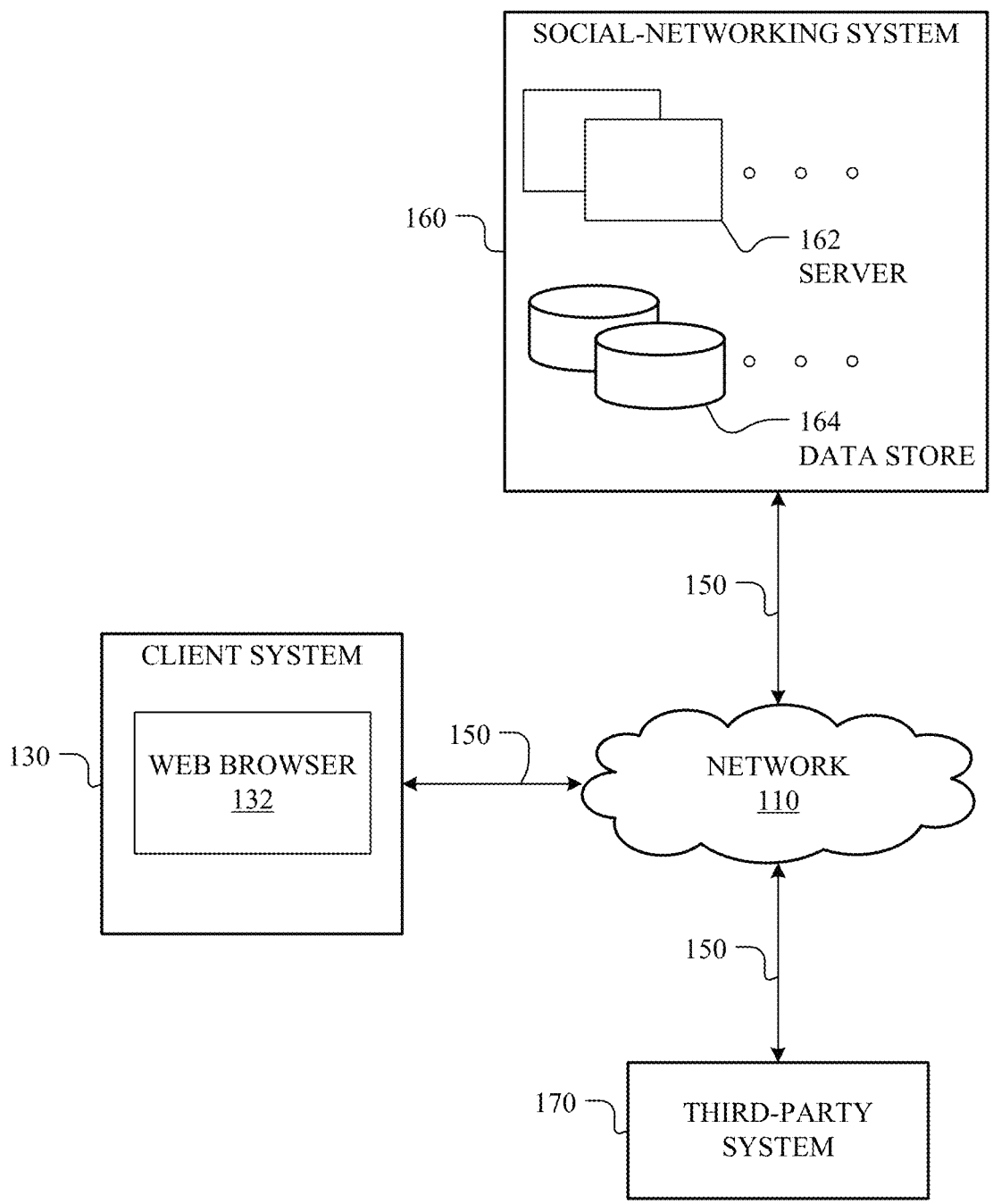
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate. More information on webpages may be found in U.S. patent application Ser. No. 11/856,202, filed 17 Sep. 2007, which is incorporated by reference.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
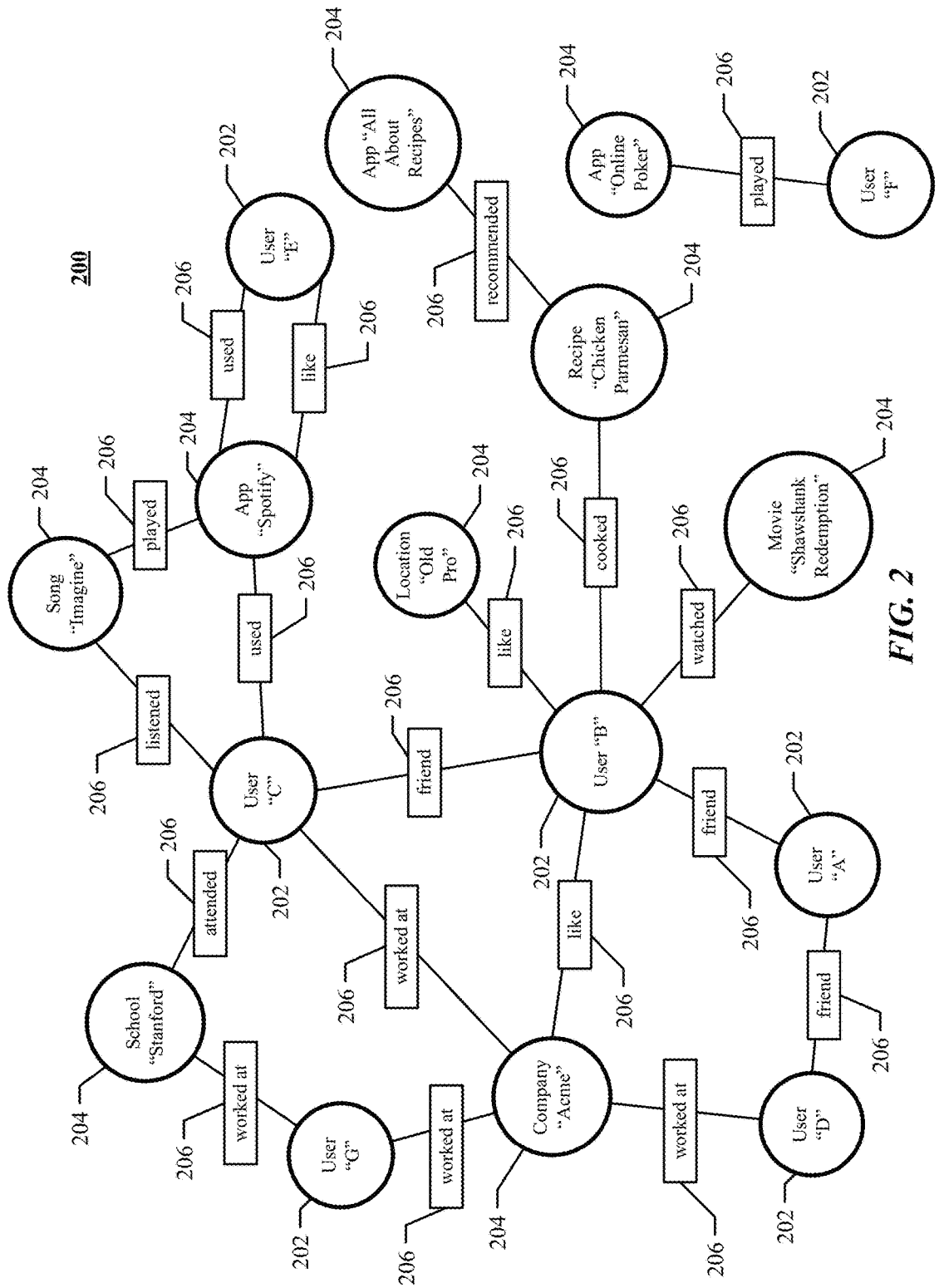
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/

0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U. S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources"

and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, transmission of information regarding the source of communications is managed according to a set of predefined rules. User preferences regarding the display of information may be provided to a communication platform, such as a traditional telephony platform, video calling platform, VoIP telephony platform, text messaging platform, email platform, and the like, for use in displaying communication participant identification information in association with a communication session. Often, social-networking systems contain information associated with a user, such as profile information, and privacy preferences or settings for the user. Such a system may also maintain a database of associated caller ID masking preferences for use in communication sessions. In particular embodiments, the caller ID masking preferences may be related to the privacy preferences or settings for the user. The caller ID masking preferences may be associated with a device identifier, such as one of the devices registered for a particular user, and may be applied to all outgoing and incoming communications for the device associated with the device identifier.

A user may be associated with use of one or more devices within the social-networking system through a device identifier, such as a phone number, MAC address, or the like. This information may be useful to users of a communication application who do not have the contact information in their own contact list or online address book. This information may be useful since the information can be used to display the name of a user or place being called, to look up a phone number that corresponds to a given user name, or provide other useful functionality. Communication platforms may additionally use this information to provide communication participant information to other users. However, certain users may prefer not to share this information with particular users, or may only wish to share this information with communication participants under certain conditions. More information on caller identification and user-profile information may be found in U.S. patent application Ser. No. 13/017,664, filed 31 Jan. 2011 and U.S. patent application Ser. No. 14/721,762 which are incorporated by reference. More information on user-to-user communication may be found in U.S. patent application Ser. No. 13/214,924, filed 22 Aug. 2011, U.S. patent application Ser. No. 13/214,940, filed 22 Aug. 2011, U.S. patent application Ser. No. 13/215,018, filed 22 Aug. 2011, U.S. patent application Ser. No. 11/856,191, filed 16 Sep. 2007, U.S. patent application Ser. No. 11/856,182, filed 17 Sep. 2007. U.S. patent application Ser. No. 13/193,477, filed 28 Jul. 2011, U.S. patent application Ser. No. 13/571,882, filed 10 Aug. 2012, and U.S. patent application Ser. No. 14/675,138, filed 31 Mar. 2015, each of which is incorporated by reference.

A user, administrator, or service provider may establish rules governing the display of associated information to communication recipients. For example, a user may establish caller ID masking rules during administration of his or her mobile device settings. As another example, caller ID masking rules can be set as a part of a user profile of a social-networking system associated with the user. As yet another example, an organization's IT manager establishes caller ID masking rules for an entire organization. Rules may be based on one or more attributes of a communication session, device, or participant. For example, a user maintains a contacts list on a mobile cellular telephone device. The contacts list contains names and contact information for friends, acquaintances, relatives, businesses, frequently used numbers, or other entities. The contact information can include device identifiers for one or more devices associated with each of the entities in the contacts list. One rule may specify that user information should only be transmitted during communication sessions with users or devices represented in the user's contact list. In this example, when the user places a call to a particular telephone number, the caller ID masking rule determines whether to transmit caller ID information with the call. The rule specifies that the contact list should be consulted. A lookup is performed using the contact list on the mobile device and the telephone number is found. Information associated with the user is transmitted to the recipient device. In another example, if the telephone number is not found, then no information is transmitted to the recipient device.

In particular embodiments, caller ID masking rules may be executed by a server side process and called by remote messaging devices or carrier networks when placing a call or routing a message. For example, a social-networking system may implement, such as via a service, an interface for communication applications and networks to retrieve caller ID masking preferences for a particular calling user. The interface is accessible by a variety of requesting applications and accesses caller ID masking rules for a particular user based on a device identifier passed in the request. The device identifier may be associated with a particular user of the social networking system through a registration process. In certain embodiments, the user has caller ID masking rules set up for his/or account. Thus, when the user places a telephone call from a terminal associated with a phone number that, in turn, is associated with the user's social-networking profile, the caller ID masking rule service may be invoked when a call is placed from the terminal. Information is transmitted in accordance with the caller ID masking rules established by the user and registered with his/her social-networking profile.

The embodiments described herein reference "calls," "messages," and "communication sessions" interchangeably. Those of ordinary skill in the art will appreciate that references to each of these terms also refer to any type of communication session including text message using MMS or SMS, application implemented messaging services, such as WHATSAPP and FACEBOOK messenger, voice calls, VoIP calls, voicemails, emails, and the like. For example, embodiments described in the context of a voice call with voice caller ID information are also equally applicable to other forms of communication.

In various embodiments described in the present disclosure, the identification rules may be referred to as "caller ID masking rules." While caller ID systems are traditionally associated with telephone calls, those of ordinary skill in the art will appreciate that the concept may be applied to various other messaging protocols. Thus, while the name "caller ID masking rules" may imply application in the telephony context, the teachings of the present disclosure apply the associated concepts to a wide range of communication protocols and should not be interpreted as being limited to merely telephony calling systems. For example, a messaging application, such as an SMS message application on a mobile device, may use caller ID masking rules to determine what information if any to display to a user when he/she receives a text message. As another example, an application with messaging functionality may utilize the teachings of the present disclosure to display participant identification information to participants in a group chat or messaging session.

In particular embodiments, caller ID masking rules may specify a set list of communication participants with which to share caller identification information. For example, parents of small children may specify that no identification information be transmitted during calls from a child's device. The parent may specify a list of approved device identifiers, including the cell phone number of the parents, the neighbors, emergency numbers and the like may be specified so that the child's identification information is only transmitted to those recipients.

Caller ID masking rules may use various data sources in rendering a decision as to what information to display in a particular communications context. In particular embodiments, identification rules can reference a social-networking system, or other social-networking related database. The social-networking system or database may include information regarding relationships between users of the social-networking system. Users and entities can be represented as nodes connected by edges which represent connections or relationships in a social graph, as described above. For example, a communication participant is represented by a node in a social-networking system. Each user in the social-networking system has one or more associated communication devices, such as phone numbers, email addresses, and the like. As another example, the parent may select approved users for the child to communicate with from these various data sources. The parent can select users of a social networking system that the parent is associated with. Such a selection may enable transmission and reception of identification information to/from those approved users on all their associated devices.

The caller ID masking rules may be based on relationships in the social-networking system. For example, identification information may only be sent to "first-level" or direct connections for a user, while no identification information is sent to recipients that are not connected to the sender via such a social-networking connection. In this example, a phone number is used to perform a reverse lookup on users in order to identify connections in the social-network.

In particular embodiments, caller ID masking rules utilize a social network to determine a level of detail and/or type of information to transmit. Communications to users with a shared connection, such as membership in a common group, may be sent with a particular set of identification information. For example, if a call is placed between two users that are both affiliated with a softball group via a social-networking system, additional information regarding the caller's softball affiliations may be displayed to the recipient. If the caller is, for example, an administrator for a recreational softball league calling to reschedule a game and the recipient is a participant in the softball league, the caller's status as an administrator may be displayed to the user. Accordingly, the recipient may give priority to the caller's communication, having recognized that the caller is an official in the softball league.

However, it may be inappropriate to display such caller identification information for communications that are not related to softball. For example, the caller's status as an administrator in a softball league would seem out of place if transmitted and displayed in connection with a business communication. Accordingly, the caller ID masking rules may mask softball affiliation information for other calls placed to phone numbers or devices that are not affiliated with any members of a softball group. It may be inappropriate or undesirable to send information identifying the child caller of the above example when the child calls particular establishments. For example, if the child in the above example calls a restaurant to order a pizza, the parent may set up rules such that the child is not identified to the restaurant. Such a configuration may alleviating concerns about advertising that a child is likely home alone and calling out for food. In particular embodiments, the parent may be notified that the child is making the call and may determine whether and what information should be shared. For example address information may be appropriate, whereas personal information is not.

A directory service, such as Active Directory, may be used in determining whether or not to display information for a communication session participant, and what type of information to display. In particular embodiments, the directory service is used in a business context to provide additional detail regarding communication session participants that work together. For example, Active Directory information including office number, mobile phone number, office location, title, and the like may be displayed during communications with co-workers. The caller ID masking rules may not display or transmit this information when communicating with outside communication recipients.

In particular embodiments, caller ID masking rules may utilize a professional networking system, such as LINKEDIN. In one example, to avoid providing job candidates with access to decision makers' personal information, a caller ID masking rule may check a professional network to determine whether an outgoing call is being placed to a job candidate (e.g., by determining whether the caller/recipient is currently employed by the employer, determining employment status for the caller/recipient, or determining a current employer of the caller/recipient). The caller's personal information may be masked according to results from performing a reverse look-up on the professional network.

Location information, including short range network connectivity between communication participants or GPS data, may be used to determine what source identification information to transmit in a communication session. In particular embodiments, caller ID information is displayed when communicating to other devices located in close proximity to the initiator of the communication session. A user may specify a distance within which to display detailed caller ID information. The distance between participants may be determined based on GPS data points, such as from a mobile device. In particular embodiments, mobile devices are capable of completing short range wireless networks using short range communication networks such as BLUETOOTH and WIFI. For example, if a calling user is connected to the same WIFI network as a recipient user, a determination may be made that the users are sufficiently close to satisfy a caller ID masking rule. Thus, information may be displayed at the recipient's terminal. As another example, a social-networking system may provide location estimates for participants of the social network. The caller ID masking rules may use these location estimates in determining whether to transmit or display communication participant information in connection with a communication session. For example, if both the calling user and the recipient user have recently checked into a particular mall, the system may estimate that the users are sufficiently close so as to display participant information during a communication session.

An authorization and approval process for determining specific communication participants that are approved to receive caller ID information may be implemented. In particular embodiments, communication source identifiers may, by default, not be transmitted for communications from a child's account or device. A communication log is created that details the child's recent communication activity and is presented to the parent for verification and approval. The parent may decide to enable transmission of communication source information for several recognized communication participants, and disable source identification information for others. For example, the parent may recognize his/her spouse's cell phone number and authorize the system to transmit identification information for the child to those devices during a communication session. Thus, particular trusted recipients may receive communication source information for future communications sent by the child. In particular embodiments, a "do not display" list may be created that lists device identifiers for recipients that should not receive participant information.

While many embodiments of the present disclosure can be implemented in an application context, such as by adding additional settings and functionality to a messaging application, certain solutions discussed herein may require collaboration with a service provider. For example, one implementation requires voice network service providers to provide an interface for dynamically controlling whether to transmit source identification information. The teachings of the present disclosure contemplate any suitable implementation, including any modifications to traditional telephony infrastructure. As discussed above, certain communication applications, such as Voice Over IP applications, may already provide such an interface.

Particular embodiments include hierarchies of communication source information and recipient groups. For example, caller ID masking rules categorize several groups of communication participants, and the type of information to send to users in each group. In particular embodiments, communication sources are associated with a social network. Additional communication source information (e.g., name, organization, address, website, etc.) may be sent to communication recipients that are closely connected via the social network with the communication sender, while a basic level of source information (e.g., name and organization) is sent to communication recipients that are merely second degree connections with the sender. In this embodiment, no communication source information is sent to recipients during communication sessions with users that are not connected to the communication source. Thus, the caller ID masking rules may specify three hierarchies of communication source information. In another example, certain prevalent information is transmitted in communications with particular recipients, such as communications between two members in a softball group including communication source information regarding the sender's various softball affiliations.

In certain embodiments, communication source information is selectively transmitted based on the nature of the recipient. For example, if the communication recipient is a food delivery business that the communication source has previously ordered from, source identification information is transmitted to allow the delivery business to map an address to the source information. In particular embodiments, the delivery address may be automatically transmitted as part of the communication source information. The nature of the recipient can be determined based on an internet or other search (e.g., a social network search). For example, a reverse lookup is performed using the internet to determine that the dialed number is a pizza restaurant. The caller ID masking rules may provide a particular set of information to all restaurants, such as address and delivery information. In particular embodiments, payment information may also be sent after a user approval process.

In particular embodiments, an interface for communication recipients to exchange identification information may be established before, during, or after a communication session. For example, a call recipient demands disclosure of source identification information for an "unknown" number before deciding whether to answer the call. The source may be prompted with this demand, and choose whether or not to transmit identification information, knowing that a refusal to transmit identification information will likely result in the user denying the call. As another example, a communication session participant may transmit additional identifying information after conclusion of a communication session. This may be useful in the case that the participants agree to exchange information during the call and are then provided with the information after the call. In certain embodiments, identification information may be transmitted during the call.

In particular embodiments, a database of source identification information, such as telephone numbers, can be created for determining the communication quality of communications from a particular source. Thus, otherwise unknown and unlisted numbers can be associated with spam telemarketers when appropriate so that other users can block such calls. For example, if a first communication source generally communicates spam messages, recipients may rate the communication source with a poor rating. Caller ID masking rules may use this ratings database in determining whether to block the communication or request additional identification information from the source before putting the call through to the communication recipient.

Privacy settings of a social network may be used in determining dynamic rules. In particular embodiments, users of a social-networking system set privacy settings for an associated user profile. These settings may be used when the user makes a call from a device that is also associated with the user's profile. For example, the user may register a telephone number and email address with a social-networking system during registration. The caller ID masking rules may determine what profile information to transmit to other communication participants based on the user's own privacy settings. If pictures of the user are only visible to the user's friends, then a profile picture of the user may be transmitted to a recipient that is associated with a social-networking profile that is connected with the user's social-networking profile.

Figure 3:
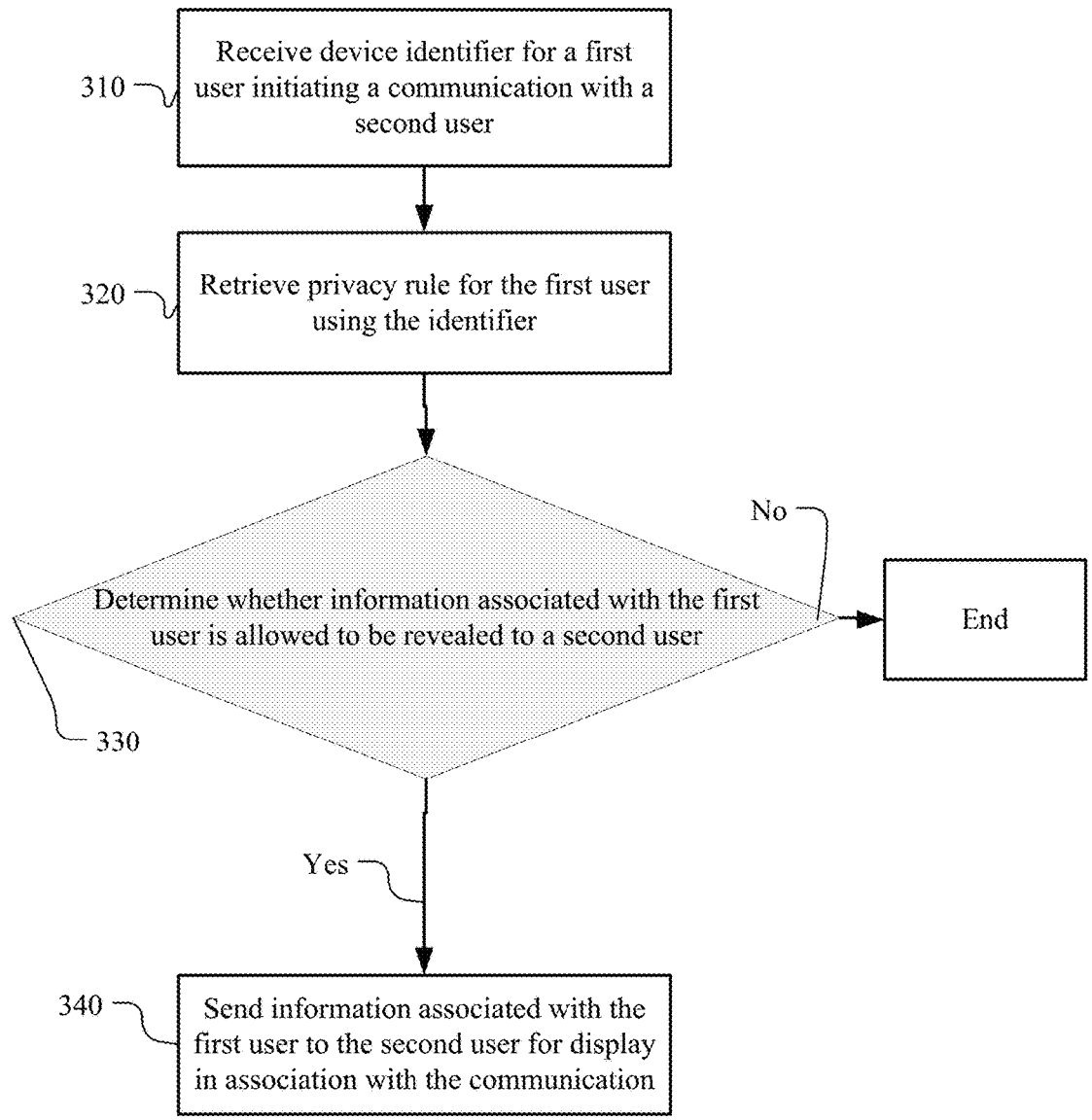
FIG. 3 illustrates an example flow chart of a method for dynamic communication participant identification.

FIG. 3 illustrates an example flow chart of a method for dynamic communication participant identification. At step 310 a device identifier for a first user initiating a communication with a second user is received. In particular embodiments, additional information is received, such as a device identifier for the second user. At step 320, privacy rules for the first user are retrieved using the device identifier. In particular embodiments, a reverse lookup is performed to locate caller ID masking rules or other privacy rules associated with the device. For example, a user may associate various communication devices using device identifiers with his or her profile in a social networking system. The user may create privacy rules or caller ID masking rules that are also associated with his/her profile. The reverse lookup identifies the privacy rules for the user.

At step 330, the received information is applied to the privacy rules to determine whether information associated with the first user is allowed to be revealed to the second user. If the privacy rules dictate that information is allowed to be revealed to the second user, that information is sent to the second user at step 340. If the privacy rules dictate that no information is allowed to be revealed to the second user, then no information is sent.

Figure 4:
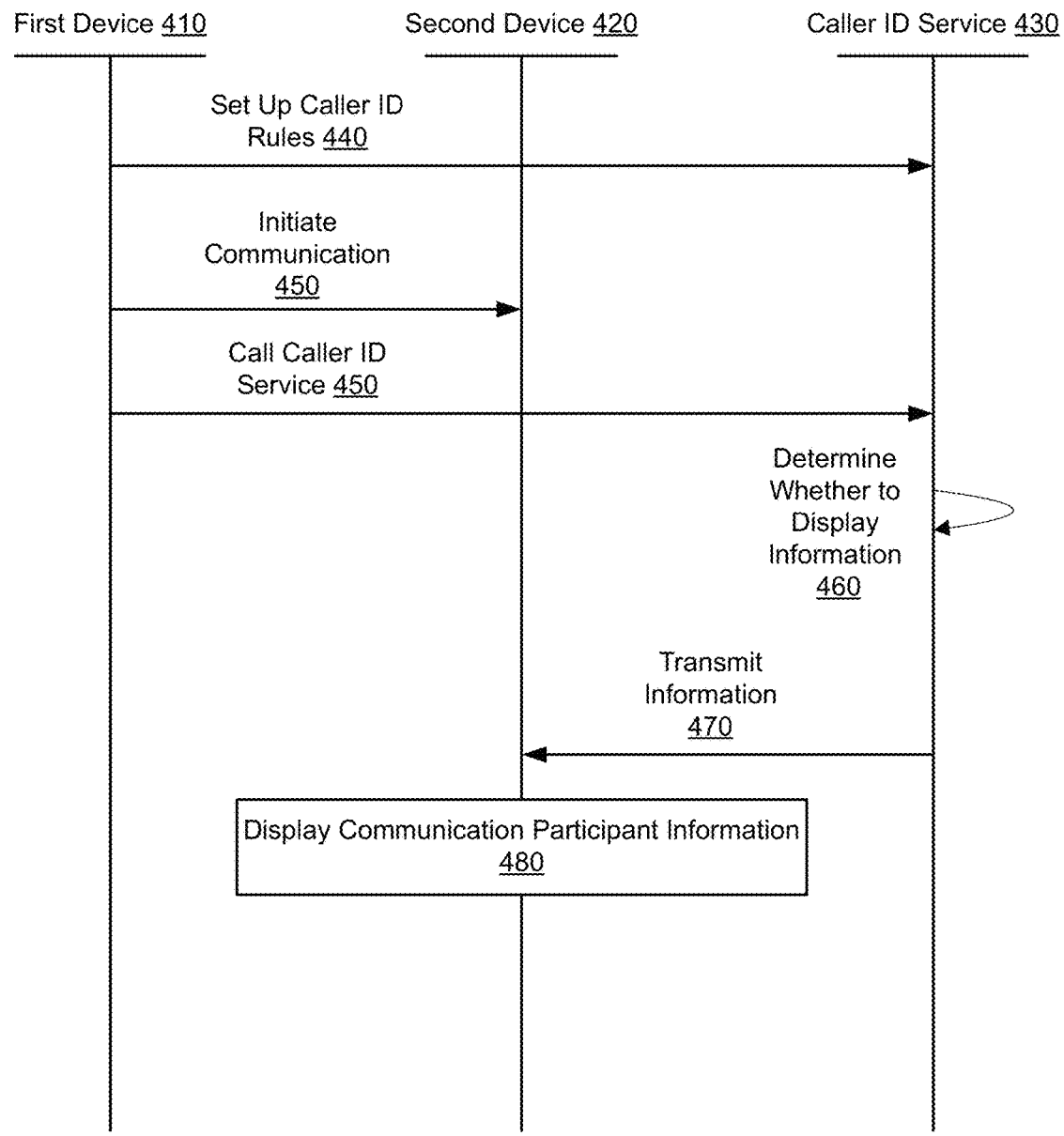
FIG. 4 illustrates an example sequence diagram for dynamic communication participant identification.

FIG. 4 illustrates a sequence diagram of a system for dynamic communication participant identification containing a first device 410, a second device 420, and a caller ID service 430. Communication devices interact with the caller ID service to transmit and display identification information in association with communication sessions. At step 440, caller ID rules are set up at caller ID service 430. In one example, the caller ID rules are established by first device 410. However, those of ordinary skill in the art will understand that any interface may be established for configured caller ID masking rules. For example, these rules may be established while setting up a social-networking profile.

At step 450, a communication is initiated by first device 410 with second device 420. Also at step 450, first device 410 calls caller ID service 430 to determine what information should be transmitted to or displayed by second device 420. These steps may happen substantially at or near the same time as each other such that when a message is sent or a call is placed by first device 410, a call is made to the caller ID service 430. At step 460, caller ID service 430 determines what information to display at second device 420. At step 470, information is transmitted from the caller ID service 430 to second device 420, and communication participant information 480 is displayed at second device 420.

In certain embodiments, caller ID rules consider whether the caller's number is known to the recipient. For example, the caller ID rules may access various data sources, such as a user's social networking system account, a user's contact list in his/her communication device, other cloud-based contact lists, or the like, to determine whether a particular caller's number is known to the recipient. The caller's number may be a device identifier of a device that the caller is using the call the recipient. In particular embodiments, the caller's number may be a device identifier associated with a messaging application, a screen name, or some other identification mechanism.

In particular embodiments, a device, service, or network may gather information regarding callers based on their associated device identifiers or phone numbers and solicit or receive feedback from call recipients regarding the caller. For example, a telemarketer calling from a particular device identifier can be flagged by a recipient user as being a retailer. The recipient may enter information regarding the name of the caller, the type of caller, the industry with which the caller is associated with, a business name, a product or service offering, or the like. When the telemarketer calls a second user, the second user's terminal can display the information gathered from the previous call recipients in order to identify the caller as a telemarketer. While this may result in reduced answer rates for telemarketers in some scenarios, it may increase profitability as those users that are actually interested in the telemarketers services can answer the call when they otherwise may ignore such a call. For example, if a user is interested in a particular product offering but generally refuses to accept any calls from unknown numbers, this mechanism may provide the user with information regarding the caller to allow the call recipient to make a more informed decision regarding fielding calls of the caller.

If the caller's number is known to the recipient, either through one of the contact lists enumerated above or through some other mechanism, certain information may be displayed regarding the user.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 5:
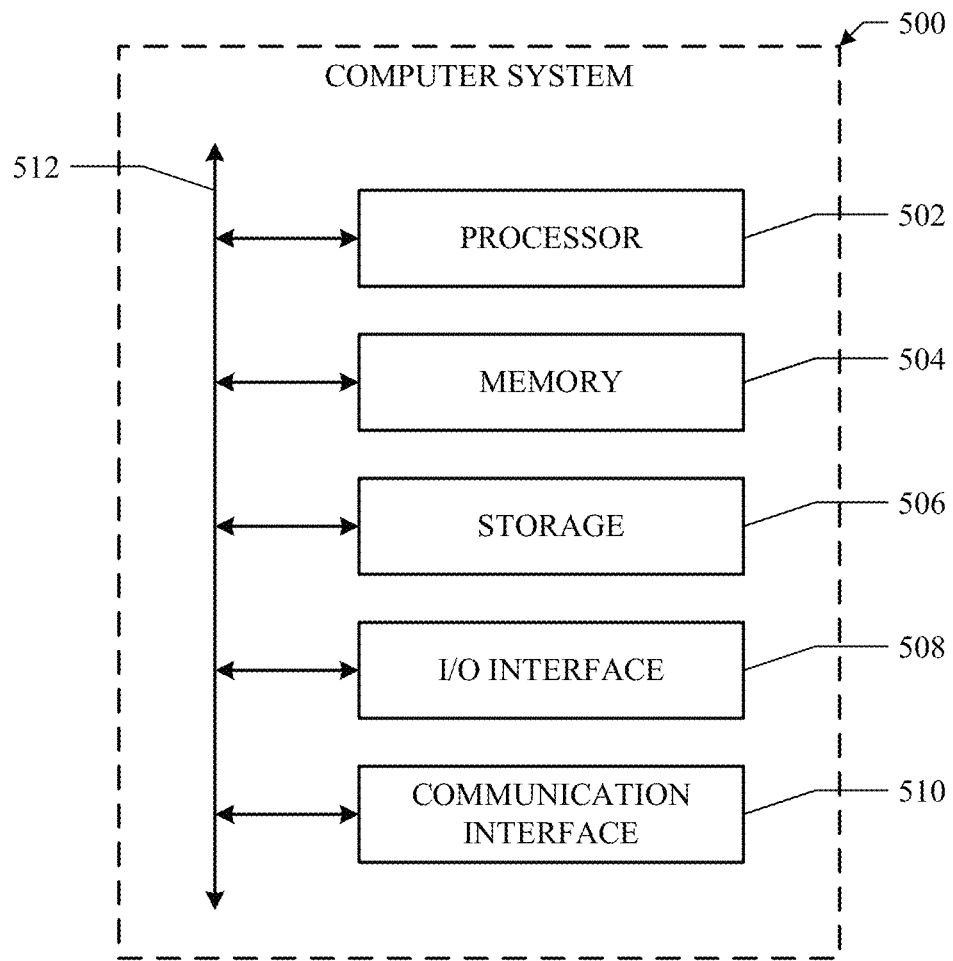
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by one or more processors, receiving an identifier for a first user initiating a communication between a first device associated with the first user and a second device associated with a second user;
   by the processors, retrieving, using the identifier, a privacy rule associated with the first user;
   by the processors, determining, based on social-networking information, a set of information about the first user for display to the second user that describes characteristics regarding the first user's membership in a common group in a social-networking system that both the first and second user are members of;
   by the processors, determining, based on the privacy rule, one or more items of information from the set of information about the first user to reveal to the second user;
   by the processors, formatting the one or more items of information regarding the first user's membership in the common group for display in a caller ID interface; and
   by the processors, sending, to the second device, the one or more items of information for display by the second device while the second device is notifying the second user about the communication to enable the second user to recognize the first user in the context of the first user's membership in the common group.

2. The method of claim 1, wherein the communication comprises a telephone call, and wherein the one or more items of information associated with the first user are sent as caller identification information to the second device by a telephone switch.

3. The method of claim 1, wherein the determining the items of information associated with the first user is further based on whether the second user is listed in a contacts list of the first user.

4. The method of claim 1, further comprising:
   in response to receiving, from the second user, a request for information associated with the first user, sending, to the second device, at least one of the one or more items of information associated with the first user.

5. The method of claim 1, wherein the communication comprises a telephone call, and the identifier comprises a telephone number of the first user.

6. The method of claim 1, wherein the communication comprises an email message, and the identifier comprises an email address of the second user.

7. The method of claim 1, wherein the communication comprises a voice over internet protocol call.

8. The method of claim 1, further comprising retrieving at least one of the one or more items of information associated with the first user by accessing a telephone network terminating central office to retrieve a name associated with the first user.

9. The method of claim 1, further comprising retrieving at least one of the one or more items of information associated with the first user from a social-networking system.

10. The method of claim 1, wherein the retrieving further comprises:
    retrieving the one or more items of information associated with the first user.

11. The method of claim 1, further comprising determining whether the one or more items of information associated with the first user are allowed to be revealed based on a relationship in a social-networking system between the first user and the second user.

12. One or more computer-readable non-transitory storage media embodying software that is operable when executed to:
    receive an identifier for a first user initiating a communication between a first device associated with the first user and a second device associated with a second user;
    retrieve, using the identifier, a privacy rule associated with the first user;
    determine, based on social-networking information, a set of information about the first user for display to the second user that describes characteristics regarding the first user's membership in a common group in a social-networking system that both the first and second user are members of;
    determine, based on the privacy rule, one or more items of information from the set of information about the first user to reveal to the second user;
    formatting the one or more items of information regarding the first user's membership in the common group for display in a caller ID interface; and
    send, to the second device, the one or more items of information for display by the second device while the second device is notifying the second user about the communication to enable the second user to recognize the first user in the context of the first user's membership in the common group.

13. The media of claim 12, wherein the communication comprises a telephone call, and wherein the one or more items of information associated with the first user are sent as caller identification information to the second device by a telephone switch.

14. The media of claim 12, wherein the determining the items of information associated with the first user is further based on whether the second user is listed in a contacts list of the first user.

15. The media of claim 12, wherein the software is further operable when executed to:
in response to receiving, from the second user, a request for information associated with the first user, send, to the second device, at least one of the one or more items of information associated with the first user.

16. The media of claim 12, wherein the communication comprises a telephone call, and the identifier comprises a telephone number of the first user.

17. The media of claim 12, wherein the communication comprises an email message, and the identifier comprises an email address of the second user.

18. The media of claim 12, wherein the communication comprises a voice over internet protocol call.

19. The media of claim 12, wherein the software is further operable when executed to retrieve at least one of the one or more items of information associated with the first user by accessing a telephone network terminating central office to retrieve a name associated with the first user.

20. A system comprising: one or more processors; and a non-transitory memory coupled to the processors comprising instructions executable by the processors, the processors operable when executing the instructions to:
receive an identifier for a first user initiating a communication between a first device associated with the first user and a second device associated with a second user;
retrieve, using the identifier, a privacy rule associated with the first user;
determine, based on social-networking information, a set of information about the first user for display to the second user that describes characteristics regarding the first user's membership in a common group in a social-networking system that both the first and second user are members of;
determine, based on the privacy rule, one or more items of information from the set of information about the first user to reveal to the second user;
format the one or more items of information regarding the first user's membership in the common group for display in a caller ID interface; and
send, to the second device, the one or more items of information for display by the second device while the second device is notifying the second user about the communication to enable the second user to recognize the first user in the context of the first user's membership in the common group.

* * * * *